United States Patent
Shiraishi

(10) Patent No.: US 7,248,378 B2
(45) Date of Patent: Jul. 24, 2007

(54) IMAGE READER WITH TWO DUPLEX COPY MODES

(75) Inventor: Ryuuichi Shiraishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 819 days.

(21) Appl. No.: 10/321,668

(22) Filed: Dec. 18, 2002

(65) Prior Publication Data

US 2003/0227654 A1    Dec. 11, 2003

(30) Foreign Application Priority Data

Jun. 5, 2002    (JP) .................... P2002-164252

(51) Int. Cl.
*H04N 1/04* (2006.01)

(52) U.S. Cl. .............. 358/1.13; 358/408; 358/496; 358/498; 399/85; 399/364; 399/374

(58) Field of Classification Search ............ None
See application file for complete search history.

(56) References Cited

U.S. PATENT DOCUMENTS

| 5,298,937 | A | * | 3/1994 | Telle ....................... 355/23 |
| 5,592,576 | A | * | 1/1997 | Hayashi ................... 382/318 |
| 5,745,253 | A | * | 4/1998 | Muramatsu et al. ....... 358/408 |
| 6,168,327 | B1 | * | 1/2001 | Tsuzuki ................... 400/188 |
| 6,169,873 | B1 | * | 1/2001 | Connolly .................. 399/365 |
| 6,188,419 | B1 | * | 2/2001 | Katamoto et al. ......... 347/129 |
| 2003/0063332 | A1 | * | 4/2003 | Sato ........................ 358/474 |
| 2005/0122544 | A1 | * | 6/2005 | Mizuhashi et al. ........ 358/1.18 |

FOREIGN PATENT DOCUMENTS

| JP | 01-171360 | 6/1989 |
| JP | 01-293757 | 11/1989 |
| JP | 2001-1160887 | 6/2001 |
| JP | 2002-354192 | 12/2002 |
| JP | 2003-307784 | 10/2003 |

* cited by examiner

*Primary Examiner*—Aung S. Moe
*Assistant Examiner*—Jacob P. Rohwer
(74) *Attorney, Agent, or Firm*—Morgan, Lewis & Bockius LLP

(57) ABSTRACT

An image reader has an original tray for feeding an original from a bundle of originals, a first transport passage for transporting the original fed by the original tray, a scanner for reading an image on one side of the original from one side of the transported original, and a CIS for reading an image on the other side of the original from the opposed side to the one side of the transport passage. To read both sides of an original, the image reader is provided with a mode of reading both sides simultaneously using the scanner and the CIS and a mode of reading both sides of the original only by the scanner with the original reversed using a third transport passage, a fourth transport passage, and a fifth transport passage without using the CIS.

14 Claims, 7 Drawing Sheets

IMAGE READER WITH TWO DUPLEX COPY MODES

The present disclosure relates to the subject matter contained in Japanese Patent Application No. 2002-164252 filed Jun. 5, 2002, which is incorporated herein by reference in its entirety.

BACKGROUND OF THE INVENTION

1. Field of the Invention

This invention relates to an image reader for reading an original image by an image sensor and the like, particularly to an image reader capable of reading original images on both sides and the like.

2. Description of the Related Art

Hitherto, an image reader for automatically reading image information on both sides of an original without the intervention of the user (automatic double-side reader) has been widely used as a reader of a copier, a facsimile, etc., or a scanner for computer input. As the automatic double-side readers, a method of reversing the side of an original in an original reversal section and reading image information is most widely adopted. That is, to input image information on both sides in the method in the related art, one side is read in an original read section and then the side of the ejected original is reversed and again is transported to the original read section for reading the other side.

However, in the automatic double-side reading by inverting the side, it is necessary to reverse the original after once being ejected and again transport the original to the original read section and thus it takes much time in reading both sides and the productivity is poor in reading both sides. The original reversal section requires a complicated mechanism to reverse the side of an original and the original jam occurrence percentage in the original reversal section is high as compared with other transport sections. Improving the reliability is required. Further, to design an automatic double-side reader that is placed in a narrow space, the necessity for inverting an original rapidly in a small diameter may occur because of the necessity for inverting the original and collating the pages of the original at the paper ejection time, etc. Consequently, it is difficult to transport an original of a predetermined cardboard having a large basis weight.

An art of automatically reading both sides in one transport is studied. For example, in JP-A-1-171360 and JP-A-1-293757, two image sensors are placed on both sides of an original path for transporting an original and both sides of an original can be read automatically in one original transport without reversing the side of the original.

Generally, to read an original, for example, a technique of applying light from a light source of a fluorescent lamp to the original and reading the reflected light by an optical sensor through a reduction optical system is adopted. As the sensor in the technique, for example, a one-dimensional CCD (Charge Coupled Device) sensor is used to process one line at a time. Upon completion of reading one line in the line direction (main scanning direction), the original is moved a minute distance in the direction orthogonal to the main scanning direction (subscanning direction) and the next line is read. This operation is repeated over the whole original size for completing reading of one page of the original. As a method of reading an original in order in the subscanning direction without moving the original, a method of moving a plurality of mirrors by a moving body such as a full-rate carriage or a half-rate carriage for reading an original in order in the subscanning direction is also available.

In the read technique, it is necessary to apply a light source to an original and reading the reflected light by a CCD sensor through several mirrors as described above and thus the whole unit tends to become large. Particularly, if a plurality of image sensors need to be placed to read both sides without reversing an original, it is difficult to place a plurality of CCD sensors because of a space problem. To solve the space problem, use of an image sensor called CIS (Contact Image Sensor) for directly reading an image by a linear sensor through a SELFOC lens using a small LED (Light Emitting Diode) as a light source is studied.

However, in the read technique using the CIS, the focal depth is very shallow and if the CIS and an original face go out of distance even a little, out-of-focus occurs and the read image becomes unclear. That is, it becomes hard to provide a sharp image although the whole unit can be reduced. Particularly, to read a color image, a color shift, etc., easily occurs and degradation of the image quality is remarkable. If both reading by the CCD sensor and reading by the CIS are used to automatically read both sides of an original, it becomes hard to match the image quality in the CCD sensor with that in the CIS. For example, if an image read through the automatic double-side reader is printed out, images different in image quality on both sides are output. Such an image quality match problem noticeably appears particularly in color images. For example, so-called business color images such as images with a small number of colors (like plus one color, etc.,) may be able to be handled, but image quality shift becomes particularly large in a catalog image, a photo image, etc., and automatic double-side reading using both the CCD sensor and the CIS cannot be practical if importance is placed on the image quality.

SUMMARY OF THE INVENTION

It is therefore an object of the invention to provide an image reader and an original feeder excellent in the ease of use to execute double-side original read.

It is another object of the invention to appropriately meet the requirements of speeding up, high image quality, etc., of image reading.

According to the invention, there is provided an image reader comprising a paper feed section for feeding an original from a bundle of originals; a transport passage for transporting the original fed by the paper feed section; a first sensor for reading an image on one side of the original from one side of the transport passage; and a second sensor for reading an image on the other side of the original from the opposed side to the one side of the transport passage, wherein the image reader has a first double-side read mode of reading the images on both sides of the original using the first sensor in order; and a second double-side read mode of reading the images on both sides of the original in one transport of the original to the transport passage using the first sensor and the second sensor. The first double-side read mode has the feature of reading one side of the original using the first sensor and then reversing the side of the original in the transport passage and reading the other side of the original using the first sensor.

The second sensor differs from the first sensor in resolution characteristic. For example, the first sensor can be an image sensor for reading reflected light on the original through a reduction optical system, and the second sensor can be an image sensor for reading reflected light on the original from a closer position than the first sensor; the images on both sides can be read using sensors different in the depth of field (focal depth), for example.

According to the invention, there is provided an image reader comprising first double-side read means for reading a first side of an original using a first sensor placed on one side of a transport passage and then reading a second side of the original again using the first senor; second double-side read means for reading a first side and a second side of an original using the first sensor and a second sensor placed on the other side of the transport passage; selection means for selecting either of the first double-side read means and the second double-side read means to read the original; and transport passage switch means for switching the original transport passage between read of the first double-side read means and read of the second double-side read means.

The selection means can select the first double-side read means to output color image data and can select the second double-side read means to output monochrome image data. The selection means can select the first double-side read means to place importance on high image quality and can select the second double-side read means to place importance on speeding up. The selection is executed not only by the user, but also based on image read setting, original recognition, etc.

According to another aspect of the invention, there is provided an original feeder being installed in a reader for reading an original, the original feeder comprising a first double-side read transport passage for transporting an original and reading a first side of the original by the reader and then again transporting the original and reading a second side of the original by the reader; a read sensor being placed at a position opposed to the reader with respect to an original transport passage for reading a second side of the original at almost the same timing as reading the first side of the original by the reader; and a second double-side read transport passage for transporting the original using a transport passage different from the first double-side read transport passage to read the second side using the read sensor. The first double-side read transport passage and the second double-side read transport passage can share a part of the original transport passage. The read sensor can be a CIS (Contact Image Sensor) and can be placed with a sensor face in a downward direction.

According to a further aspect of the invention, there is provided an original read method of reading both sides of an original transported by an original feeder, the original read method being capable of outputting color image data and comprising-determining whether or not monochrome image data is to be output; if it is determined that monochrome image data is to be output, reading both sides of an original using a first sensor and a second sensor placed at an opposed position to the first sensor with respect to a transport passage; determining whether or not color image data is to be output; and if it is determined that color image data is to be output, reading both sides of an original using the first sensor without using the second sensor.

According to a further aspect of the invention, there is provided an original read method of reading both sides of an original transported by an original feeder and comprising determining whether or not high-quality image data is to be output; if it is determined that high-quality image data is to be output, reading a first side of an original by a first sensor and then reversing the original and reading a second side of the original by the first sensor; and if it is determined that high-quality image data need not be output, reading both sides of the original in one original transport using the first sensor and a second sensor placed at an opposed position to the first sensor with respect to a transport passage.

DETAILED DESCRIPTION OF THE PREFERRED EMBODIMENTS

Referring now to the accompanying drawings, there is shown a preferred embodiment of the invention.

Figure 1:
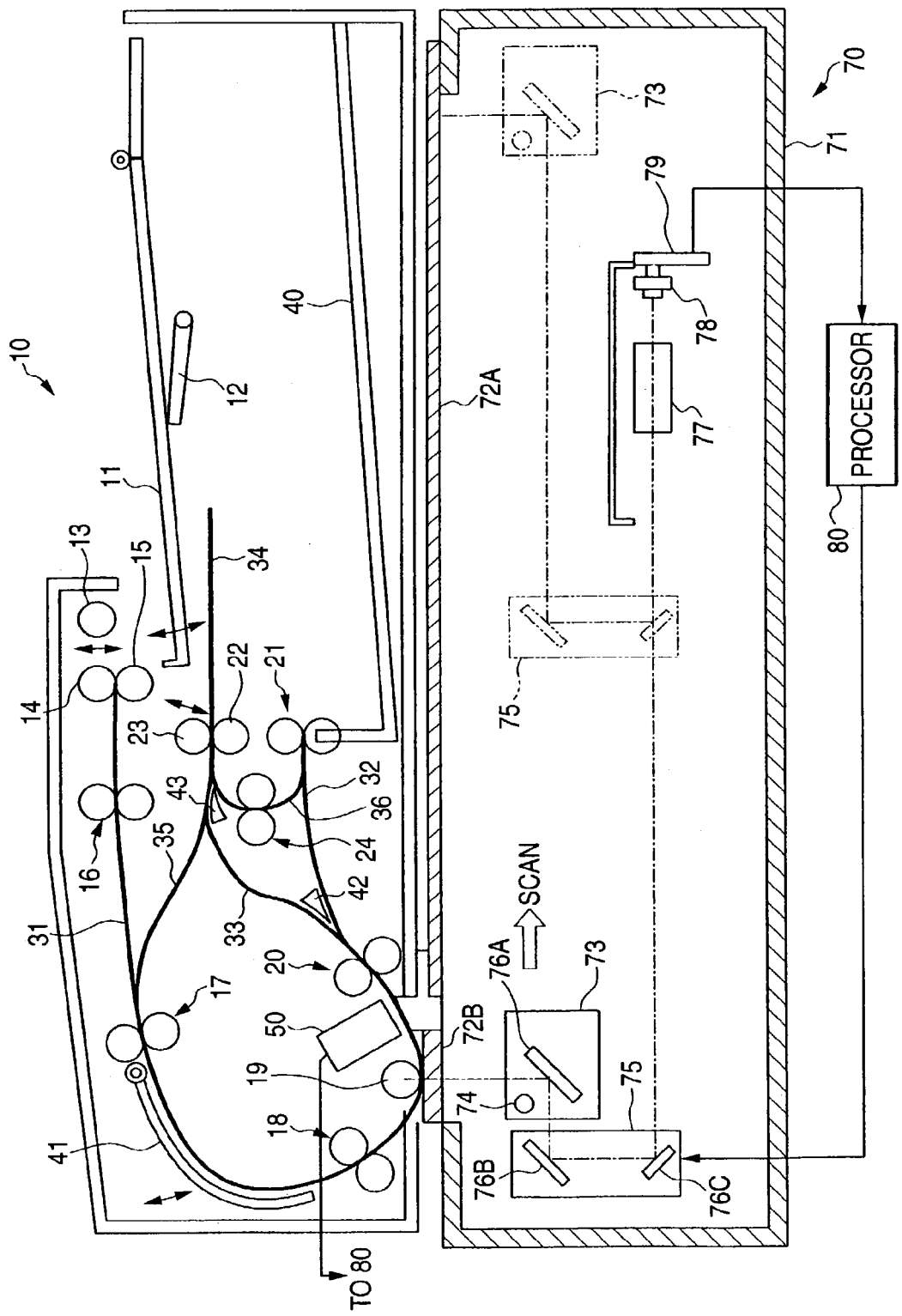
FIG. 1 is a drawing to show an image reader incorporating an embodiment of the invention.

FIG. 1 is a drawing to show an image reader incorporating an embodiment of the invention. The image reader includes an original feeder 10 for transporting originals in order from a stacked original bundle, a scanner 70 for reading an image by scanning, and a processor 80 for processing a read image signal.

The original feeder 10 comprises an original tray 11 for stacking an original bundle of a plurality of originals and a tray lifter 12, for moving up, and down the original tray 11. It also comprises a naja roll 13 for transporting an original on the original tray 11 moved up by the tray lifter 12, a feed roll 14 for transporting the original transported by the naja roll 13 further to a downstream point, and a retard roll 15 for handling the originals supplied by the naja roll 13 separately one by one. First, an original is fed to a first transport passage 31. Along with the first transport passage 31, there are a take away roll 16 for transporting the originals handled separately one by one to a downstream roll, a preregistration roll 17 for transporting the original further to a downstream roll and making a loop, a registration roll 18 for restarting rotation in timing after once stopping and supplying the original while performing registration adjustment for an original read section, a platen roll 19 for assisting in transporting the original being read, and an out roll 20 for transporting the read original furthermore downstream. The original feeder 10 also comprises a baffle 41 for rotating on a supporting point in response to the loop state of the transported original in the first transport passage 31. Further, the original feeder 10 comprises a CIS (Contact Image Sensor) 50 serving as a second sensor in this embodiment and disposed between the platen roll 19 and the out roll 20.

A second transport passage 32 and a third transport passage 33 are provided downstream from the out roll 20. The original feeder 10 comprises a transport passage switch gate 42 for switching the transport passages, an ejection tray 40 for stacking the read originals, and a first ejection roll 21 for ejecting the originals to the ejection tray 40. The original feeder 10 also comprises a fourth transport passage 34 for switching back the original passed through the third transport passage 33, an inverter roll 22 and an inverter pinch roll 23 being placed in the fourth transport passage 34 for actually switching back the original, a fifth transport passage 35 for again guiding the original switched back by the fourth transport passage 34 into the first transport passage 31 comprising the preregistration roll 17, etc., a sixth transport passage 36 for ejecting the original switched back by the fourth transport passage 34 to the ejection tray 40, a second ejection roll 24 being placed in the sixth transport passage 36 for transporting the reversed and ejected original to the first ejection roll 21, and an exit switch gate 43 for switching the fifth transport passage 35 and the sixth transport passage 36.

The naja roll 13 is lifted up and is held in a retreat position in a standby mode. When an original is transported, the naja roll 13 falls to a nip position (original transport position) and transports the top original on the original tray 11. The naja roll 13 and the feed roll 14 transport the original by joining of a feed clutch (not shown). The preregistration roll 17 makes the original lead abut against the registration roll 18 that is stopped for making a loop. When the loop is made, the original lead caught in the registration roll 18 is returned to the nip position. When the loop is formed, the baffle 41 opens with the supporting point as the center and functions so as not to interfere with the original loop. The take away roll 16 and the preregistration roll 17 hold the loop during reading. As the loop is formed, the read timing can be adjusted and a skew involved in transporting the original at the read time can be suppressed for enhancing the adjustment function of registration. The registration roll 18 which is stopped starts to rotate in the read start timing, the original is pressed against second platen glass 72B (described later) by the platen roll 19, and image data is read from the lower face direction.

At the termination time of reading a single-sided original or at the termination time of simultaneous reading both sides of a double-sided original, the transport passage switch gate 42 is switched so as to guide the original passed through the out roll 20 into the second transport passage 32 and eject the original to the ejection tray 40. At the sequential read time of a double-sided original, the transport passage switch gate 42 is switched so as to guide the original into the third transport passage 33 to reverse the original. At the sequential read time of a double-sided original, the inverter pinch roll 23 is retracted with feed clutch (not shown) off and nip is opened for guiding the original into the inverter path (fourth transport passage 34). Then, the inverter pinch roll 23 is nipped for guiding the original to be inverted to the preregistration roll 17 by the inverter roll 22 or transporting the original to be reversed and ejected to the second ejection roll 24 of the sixth transport passage 36.

The scanner 70 may comprise the above described original feeder 10 and supports the original feeder 10 on a unit frame 71 and reads an image of the original transported by the original feeder 10. The scanner 70 comprises on the unit frame 71 serving as a cabinet, a first platen glass 72A for placing the original whose image is to be read in a still state and a second platen glass 72B having an opening of light to read the original being transported by the original feeder 10.

The scanner 70 comprises a full-rate carriage 73 standing still below the second platen glass 72B and scanning over the whole of the first platen glass 72B for reading an image, and a half-rate carriage 75 for supplying light provided from the full-rate carriage 73 to an image coupling section. The full-rate carriage 73 comprises an illumination lamp 74 for applying light to an original and a first mirror 76A for receiving reflected light from the original. Further, the half-rate carriage 75 comprises a second mirror 76B and a third mirror 76C for supplying light provided from the first mirror 76A to an image formation section. Further, the scanner 70 comprises an image formation lens 77 for optically reducing an optical, image provided from the third mirror 76C, a CCD (Charge Coupled Device) image sensor 78 for performing photoelectric conversion of the optical image formed through the image formation lens 77, and a drive board 79 comprising the CCD image sensor 78. An image signal provided by the CCD image sensor 78 is sent through the drive board 79 to the processor 80.

To read the image of the original placed on the first platen glass 72A, the full-rate carriage 73 and the half-rate carriage 75 move in the scanning direction (arrow direction) in a 2:1 ratio. At this time, light of the illumination lamp 74 of the full-rate carriage 73 is applied to the read side of the original and reflected light from the original is reflected on the first mirror 76A, the second mirror 76B, and the third mirror 76C in order and is guided into the image formation lens 77. The light guided into the image formation lens 77 is formed on the light reception face of the CCD image sensor 78. The CCD image sensor 78 is a one-dimensional sensor for processing one line at a time. Upon completion of reading one line in the line direction (main scanning direction), the full-rate carriage 73 is moved in the direction orthogonal to the main scanning direction (subscanning direction) and the next line of the original is read. This operation is repeated over the whole original size for completing reading of one page of the original.

On the other hand, the second platen glass 72B is made of a transparent glass plate of a long plate-like structure, for example. The original transported by the original feeder 10 passes through on the top of the second platen glass 72B. At this time, the full-rate carriage 73 and the half-rate carriage 75 are in a stop state at the positions indicated by the solid lines. First, the reflected light on the first line of the original passed through the platen roll 19 of the original feeder 10 is formed on the image formation lens 77 through the first mirror 76A, the second mirror 76B, and the third mirror 76C, and the image is read by the CCD image sensor 78 of a first sensor in the embodiment. That is, the one line in the main scanning direction is processed at a time by the CCD image sensor 78 of a one-dimensional sensor and then the next line in the main scanning direction, of the original transported by the original feeder 10 is read. After the original lead arrives at the read position on the second platen glass 72B, the original passes through the read position on the second platen glass 72B. The read of one page over the subscanning direction is now complete.

In the embodiment, at the transport time of the original whose first side is read by the CCD image sensor 78 on the second platen glass 72B as the full-rate carriage 73 and the half-rate carriage 75 are stopped, the second side of the original can be read by the CIS 50 of a second sensor at the same time (which means almost the same original transport time rather than the complete time match). That is, the CCD image sensor 78 of the first sensor and the CIS 50 of the second sensor make it possible to read images on both sides of the original as the original is once transported to the transport passage.

Figure 2:
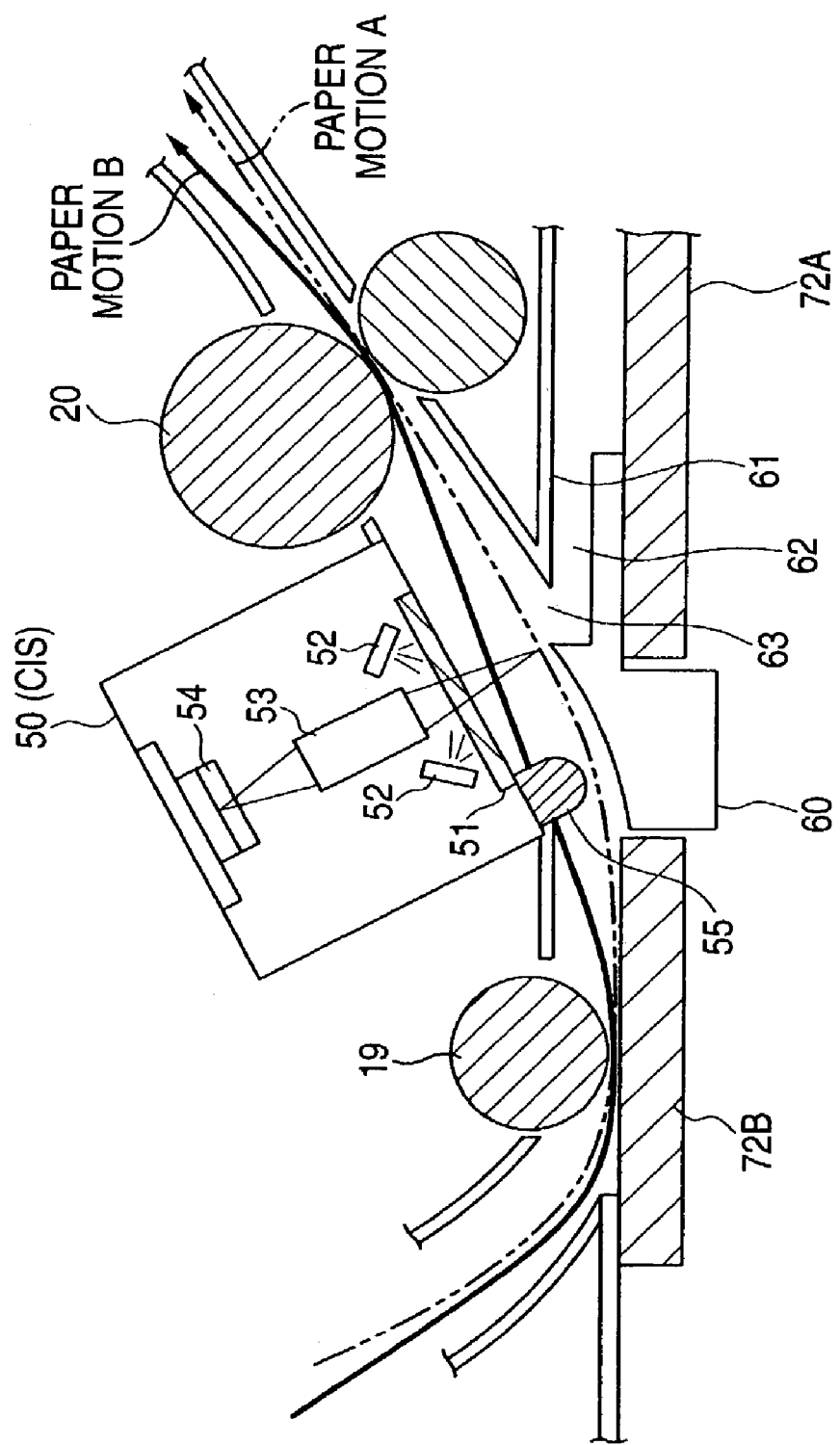
FIG. 2 is a drawing to describe the read structure using a CIS.

FIG. 2 is a drawing to describe the read structure using the CIS 50. As shown in FIG. 2, the CIS 50 is placed between the platen roll 19 and the out roll 20. One side (first side) of an original is pressed against the second platen glass 72B and the image on the first side is read by the CCD image sensor 78. On the other hand, in the CIS 50, the image on the other side (second side) is read from the opposed side with respect to the transport passage transporting the original. The CIS 50 comprises glass 51, LEDs (Light-Emitting Diodes) 52 for applying light to the second side of the original through the glass 51, a SELFOC lens 53 of a lens array for gathering reflected light from the LEDs 52, and a line sensor 54 of an image sensor for reading the light gathered through the SELFOC lens 53. As the line sensor 54, a CCD or CMOS sensor, an intimate contact type sensor, etc., can be used, and an image of actual width (for example, A4 length width 297 mm) can be read. Since the CIS 50 reads the image using the SELFOC lens 53 and the line sensor 54 without using a reduction optical system, the structure can be simplified, the cabinet can be miniaturized, and the power consumption can be decreased. To read a color image, as the LEDs 52, three color LED light sources of R (red), G (green), and B (blue) may be used in combination and as the line sensor 54, a set of three rows of sensors for three color of RGB may be used.

For the CIS 50 to read an image, the transport passage forming the read section is provided with a control member 55 extended from the cabinet of the CIS 50 and an abutment member 60 for abutting paper pressed by the control member 55. A guide member 61 is placed downstream from the abutment member 60 and an opening 63 is made between the guide member 61 and the abutment member 60. Further, a garbage dump section 62 for accumulating garbage and dust deposited on the surface of the original is placed at a place contiguous to the opening 63, below the guide member 61. The control member 55 and the abutment member 60 are placed corresponding to the position of the transport passage from the front to the rear of the original feeder 10 in the direction orthogonal to the transport passage of the original (namely, in the direction from the front to the rear of the original feeder 10).

Figure 3:
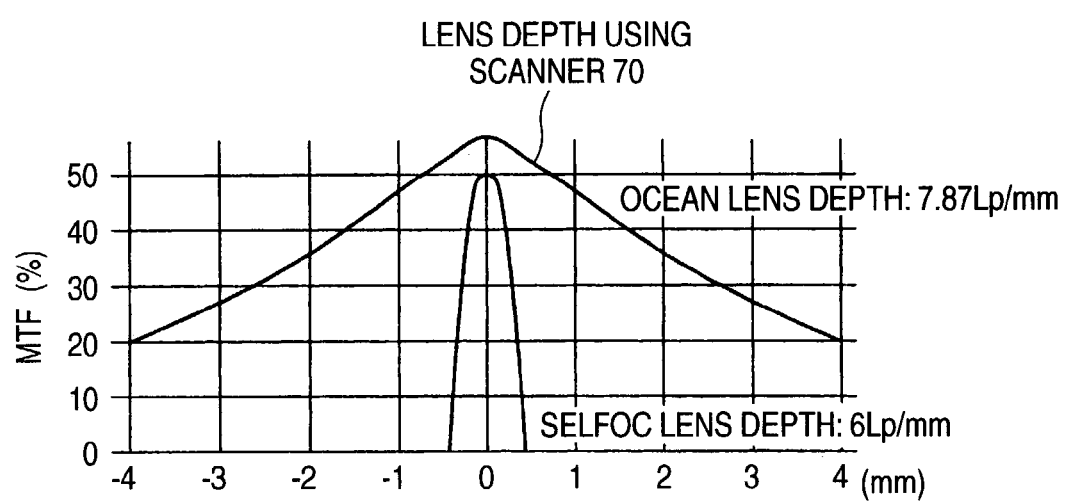
FIG. 3 is a drawing to describe a focal depth as lens image formation performance.

Since the CIS 50 adopts the SELFOC lens 53 as the optical image formation lens, the depth of focus (field) is deep. FIG. 3 is a drawing to describe the focal depth as lens image formation performance. The figure shows examples of MTF (Modulation Transfer Function) of the lens depth (7.8 Lp/mm) using a reduction optical system of the scanner 70, etc., in the embodiment and MTF of the lens depth (6 Lp/mm) using the SELFOC lens 53. The term "Lp/mm" is a value indicating how many ladder patterns of black and white exist per mm. The MTF indicates how spatial information (contrast) of a subject is faithfully reproduced from a low frequency band (coarse cells) to a high frequency band (fine cells) as frequency characteristics. The vertical axis in FIG. 3 indicates the MTF (%) and the horizontal axis indicates the state 1 mm at a time brought apart from the best pint position on the platen glass, etc., and the state 1 mm at a time brought close to the best pint position.

For example, when an original is read, if MTF 20% or more is a target, to use the scanner 70 in the embodiment, the scanner comes into given focus and the depth of field can be taken large even about ±4 mm. On the other hand, to use the SELFOC lens 53, if MTF 20% or more is a target, the depth of field is narrow as about ±0.3 mm and is about $1/13$ or less as compared with the case where the scanner 70 is used. That is, for the CIS 50 to read an image in the embodiment, the original read position needs to be placed in a predetermined narrow range.

In the embodiment, the control member 55 is provided for pressing the original against the abutment member 60 for transporting the original, so that the attitude of the original between the platen roll 19 and the out roll 20 can be controlled stably. "Paper motion B" indicated by the solid line arrow in FIG. 2 indicates motion of paper if the control member 55 does not exist, and "paper motion A" indicated by the chain double-dashed line arrow indicates motion of paper when the control member 55 is provided. It can be seen from "paper motion A" that the original is pressed against the abutment member 60 and is transported. That is, the transported original is read with the original pressed against the abutment member 60 by the control member 55, whereby incomplete focusing when the CIS 50 of shallow depth of field is used is improved.

Next, the processor 80 shown in FIG. 2 will be discussed.

Figure 4:
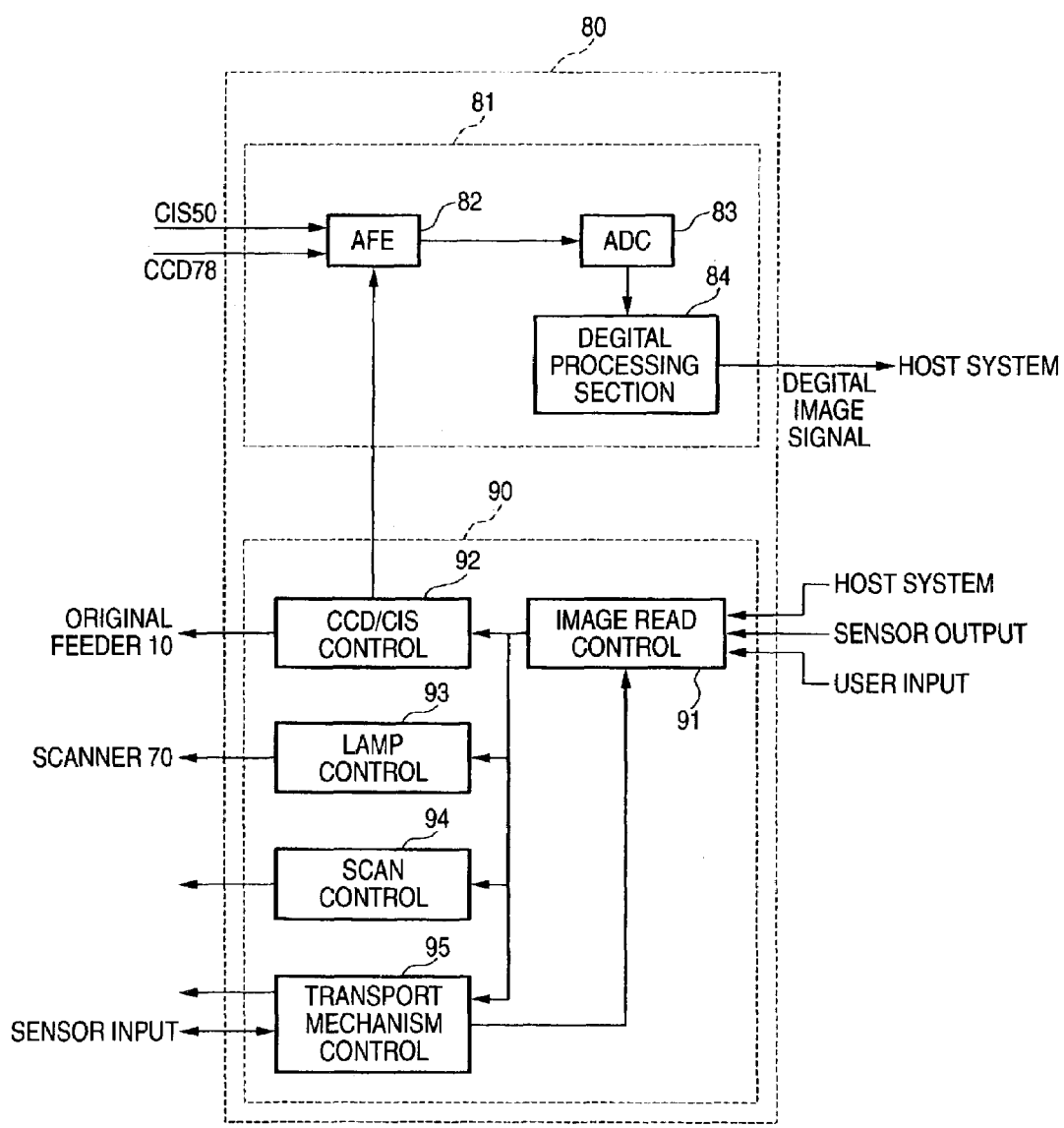
FIG. 4 is a block diagram to describe a processor.

FIG. 4 is a block diagram to describe the processor 80. The processor 80 incorporating the embodiment of the invention comprises a signal processing section 81 for processing image information provided by the sensors (CCD image sensor 78 and line sensor 54) and a control section 90 for controlling the original feeder 10 and the scanner 70. The signal processing section 81 comprises an AFE (Analog Front End) 82 for processing an analog signal, an ADC (Analog to Digital Converter) 83 for converting the analog signal into a digital signal, and a digital processing section 84 for performing various types of processing of shading correction, offset correction, etc., for the digital signal. The digital signal processed by the digital processing section 84 is output to a host system and, for example, is output to a printer as image information.

The control section 90 comprises an image read control 91 for controlling the whole of the original feeder 10 and the scanner 70 including control of double-side read, control of single-side read, etc., a CCD/CIS control 92 for controlling the CCD image sensor 78 of the first sensor and the CIS 50 of the second sensor, a lamp control 93 for controlling the LEDs of the CIS 50 and the illumination lamp 74 of the full-rate carriage 73 in read timing, a scan control 94 for turning on/off a motor in the scanner 70 for controlling the scan operation with the full-rate carriage 73 and the half-rate carriage 75, and a transport mechanism control 95 for controlling a motor in the original feeder 10 and controlling the operation of the rollers, the operation of the feed clutch, the gate switch operation, etc. Control signals are output from the controls to the original feeder 10 and the scanner 70, and the operation control is made possible based on the control signals. The image read control 91 sets the read mode based on the control signal from the host system, sensor output detected in an automatic selection read function, for example, user's selection, etc., and controls the original feeder 10 and the scanner 70.

In the embodiment, when an image is read as an original is transported by the original feeder 10, the original transported via the second platen glass 72B to the platen roll 19 can be read using the scanner 70 (CCD image sensor 78) and can also be read using the CIS 50 placed in the original feeder 10. However, as described above, read of the CCD image sensor 78 using the mechanism of the scanner 70 and read using the SELFOC lens 53 of the CIS 50 differ in focal depth, and becomes different in resolution characteristic. Particularly, to read a color image of a photo, etc., it becomes difficult to perform color matching in both the reads and the image qualities provided in both the reads become different. Then, in the embodiment, a plurality of read modes are provided for making it possible to select the optimum mode based on the setup state of the unit, the original type, user's selection, etc.

Figure 5:
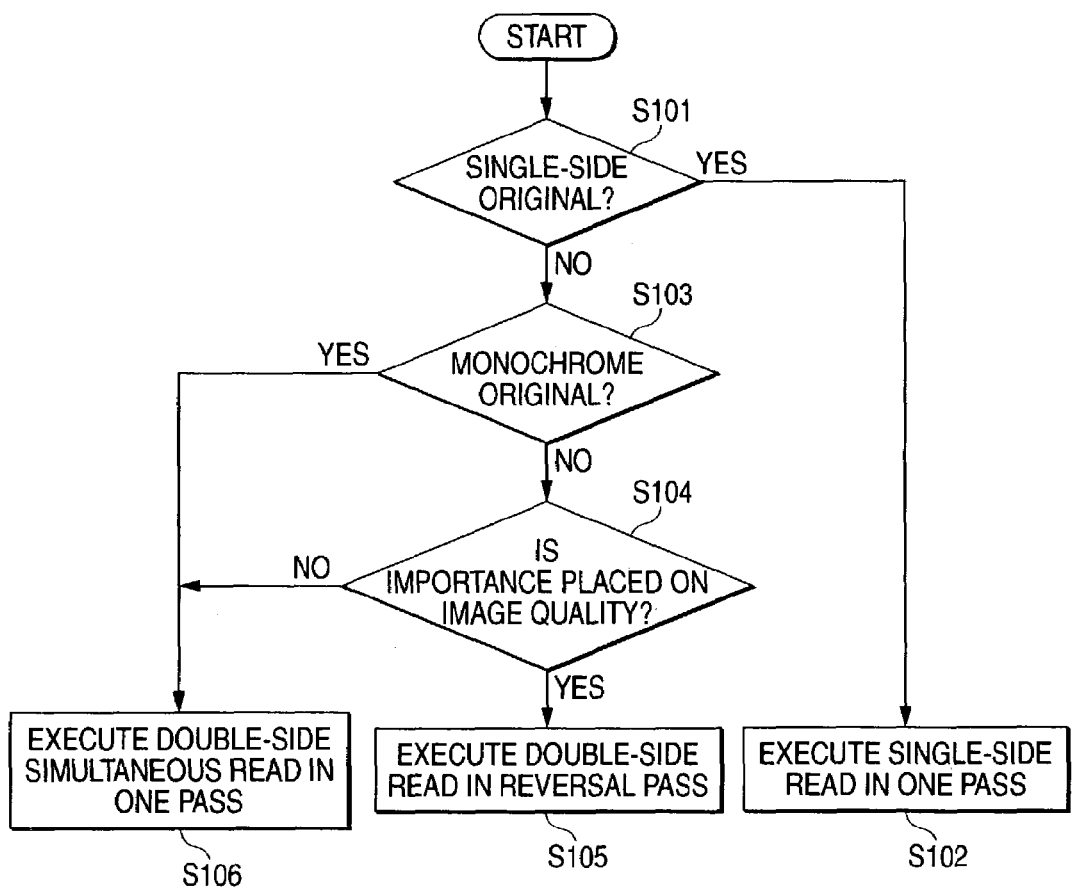
FIG. 5 is a flowchart to show an example of processing executed by an image read control.

FIG. 5 is a flowchart to show an example of processing executed by the image read control 91 shown in FIG. 4. The image read control 91 first determines whether or not the original to be transported is a single-side original (step 101). This determination can be made based on selection of the user using a control panel (not shown) placed on the scanner 70, sensors (not shown) placed on both sides of the first transport passage 31 before an image is read, for example, if the automatic selection read function works, etc. A request from the host system, selection of the user through a network, etc., is also possible. If it is determined at step 101 that the original is a single-side original, single-side read in one pass (only one original transport pass using no reversal pass) is performed (step 102). In the single-side read in one pass, either of read of the CCD image sensor 78 and read of the CIS 50 may be selected; however, to realize image read of higher image quality, preferably read of the CCD image sensor 78 is selected. In such a case, the original is placed so that the single-side original portion exists upward on the original tray 11 and the first page of the original comes on the top of the original tray 11, and the original is transported starting at the first page and the pages are read in order.

If it is not determined at step 101 that the original is a single-side original, namely, if the original is a double-side original, whether or not the original is a monochrome original is determined (step 103) based on selection of the user or the automatic selection read function as at step 101. Even if the original is a color original, the user may want to read the original in monochrome. Not to perform monochrome read, namely, to perform color read, whether or not importance is placed on the image quality is determined (step 104). For example, as for a color image of a color photo, pamphlet, etc., generally importance is placed on the image quality rather than productivity of raising the read speed. The determination is also made based on user's setting, etc. If it is determined at step 104 that importance is placed on the image quality, double-side read in a reversal pass of a first double-side read mode is executed (step 105). That is, both the first and second sides of the original are read by the CCD image sensor 78 of the first sensor without being read by the CIS 50. Accordingly, it is made possible to read both the first and second sides of the original with high image quality using the read means of deep focal depth.

On the other hand, if it is determined at step 103 that monochrome read is executed or if importance is not much placed on the image quality and is placed on any other factor such as productivity, double-side simultaneous read in one pass using no reversal pass, of a second double-side read mode is executed (step 106). For example, although color image output is required at step 104, in case of business color in which importance is not placed on delicate tint or in case of plus one color (in addition to black, any other one color of red, blue, etc., is contained), the second double-side read mode is executed. That is, the first side is read by the CCD image sensor 78 of the first sensor and in the transport passage of the read, the second side is read by the CIS 50 in the same transport passage. Thus, the need for twice transporting the original to the same read section is eliminated, the original read speed can be increased, and the transport passage is simplified, so that original transport trouble of an original jam, etc., can be suppressed. As described above, "simultaneous read" does not necessarily means time match and means reading of both sides at almost the same time in one pass.

The processing flow shown in FIG. 5 can also be simplified in double-side original read. To read a monochrome original the double-side simultaneous read at step 106 is executed, and to read a color original the original is read in order in a reversal passage at step 105. The modes can also be mixed for use in response to the original side type.

Next, original transport methods in the original read modes will be discussed with reference to FIGS. 6 and 7.

Figure 6:
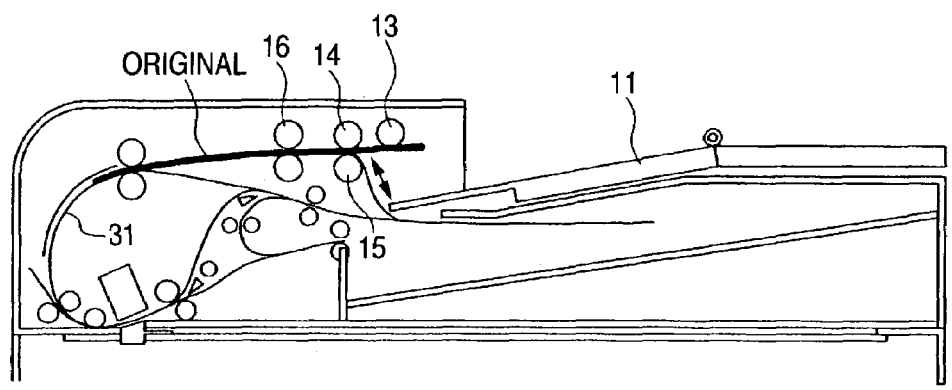
FIGS. 6(a) and 6(b) are drawings to show original passage in a single-side read mode in one passage and second double-side read mode of double-side simultaneous read in one passage.
Figure 6:
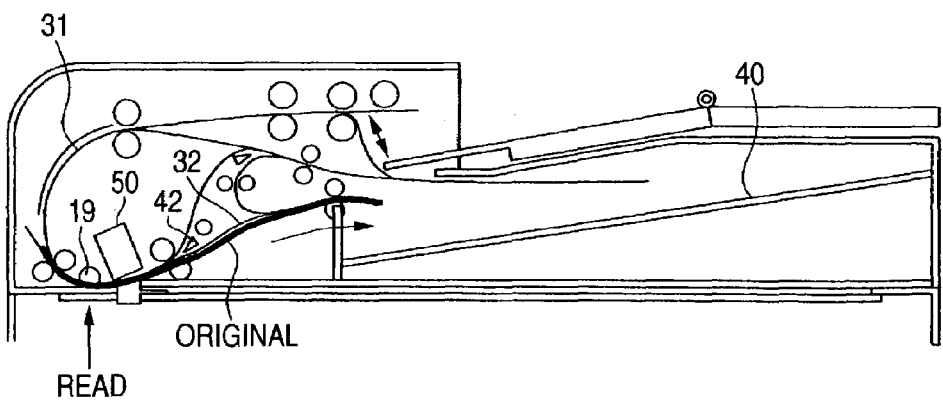

FIGS. 6(*a*) and 6(*b*) are drawings to show original passes in the single-side read mode in one pass at step 102 in FIG. 5 and the second double-side read mode of double-side simultaneous read in one pass at step 106. As shown in FIG. 6(*a*), the original placed on the original tray 11 is supplied in order by the naja roll 13, the feed roll 14, the retard roll 15, and the take away roll 16 to the first transport passage 31. As shown in FIG. 6(*b*), the supplied original passes through the read section of the platen roll 19 and the read section of the CIS 50, is moved to the second transport passage 32 by the transport passage switch gate 42, and is ejected to the ejection tray 40 in order. To read a single side, the original is read using the CCD image sensor 78 of the scanner 70 shown in FIG. 1 from downward at the place of the platen roll 19. However, single-side read using the CIS 50 can also be executed as described above. To execute double-side simultaneous read in one pass, the first side is read using the CCD image sensor 78 of the scanner 70 and the second side is read using the CIS 50 at the same transport time. This makes it possible to read both sides of the original in one original pass.

Figure 7:
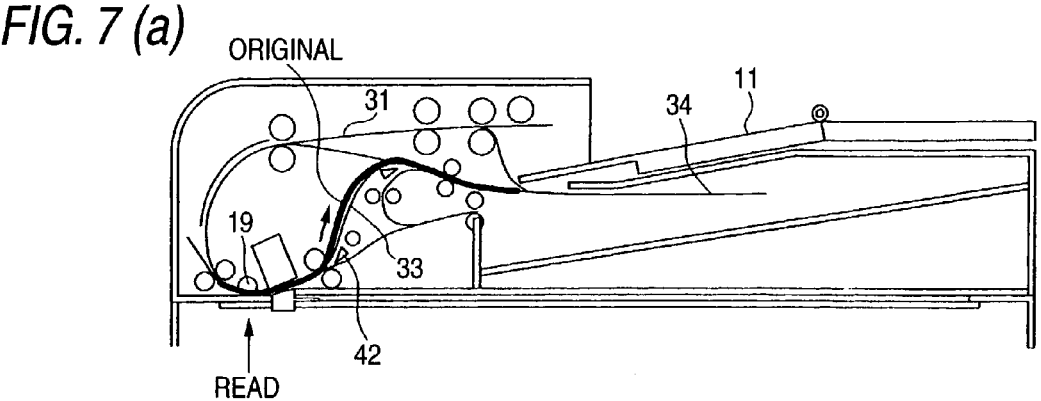
FIGS. 7(a) to 7(d) are drawings to describe double-side read in a reversal pass.
Figure 7:
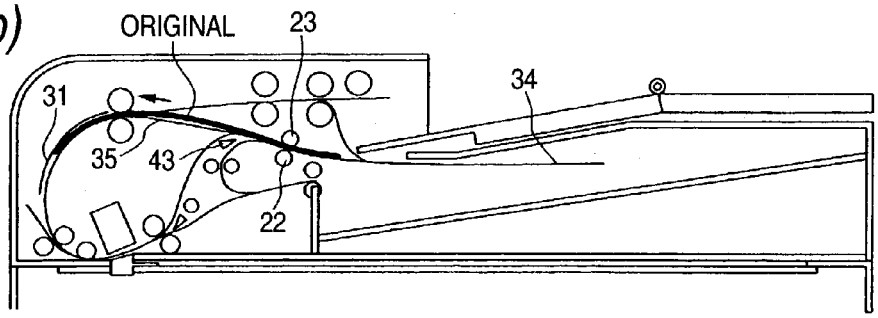
Figure 7:
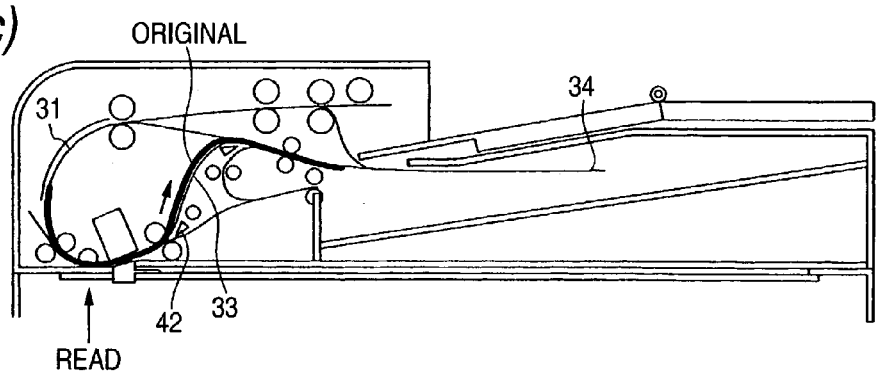
Figure 7:
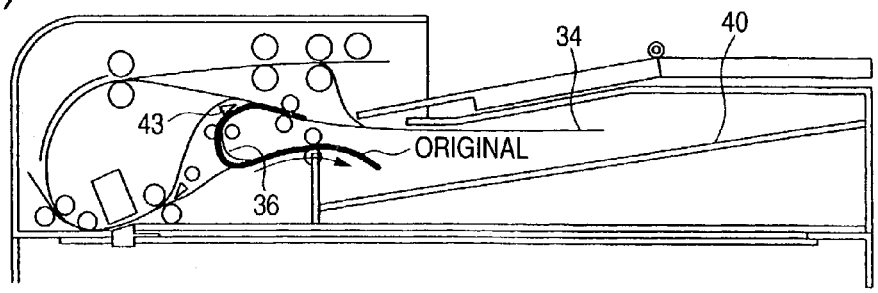

FIGS. 7(*a*) to 7(*d*) are drawings to describe the double-side read in a reversal pass at step 105 in FIG. 5, namely, the first double-side read mode. As shown in FIG. 7(*a*), the original placed on the original tray 11 is supplied in order to the first transport passage 31, and is read from downward at the place of the platen roll 19 using the CCD image sensor 78 of the scanner 70 shown in FIG. 1. The original is passed through the third transport passage 33 by the transport passage switch gate 42 and is moved to the fourth transport passage 34. The original completely exiting the third transport passage 33 is switched back by the inverter roll 22 and the inverter pinch roll 23 and is supplied to the fifth transport passage 35 as shown in FIG. 7(*b*).

The original supplied to the fifth transport passage 35 is again supplied to the first transport passage 31. As shown in FIG. 7(*c*), the original is read from downward by the CCD image sensor 78 of the scanner 70. At this time, the side of the original shown in FIG. 7(*a*) is reversed and consequently the reversed side (in this case, the second side) is read. The original whose second side is read is in a state in which the side is reversed and if the original is ejected to the ejection tray 40 as it is, the pages of the original stacked after, being read are placed out of order. Then, as shown in FIG. 7(*c*), the original whose second side has been read is passed through the third transport passage 33 using the transport passage switch gate 42 and is moved to the fourth transport passage 34. The original supplied to the fourth transport passage 34 and completely passed through the portion of the exit switch gate 43 is passed through the sixth transport passage 36 by the exit switch gate 43 and is ejected to the ejection tray 40 as shown in FIG. 7(*d*). This makes it possible to collate the pages of the original after being read in the first double-side read mode of reading the images on both sides of the original in order.

As described above in detail, according to the embodiment, there are provided the first double-side read mode of reading one side (first side) of an original using the CCD image sensor 78 of the first sensor and then reversing the side of the original and reading the other side (second side) of the original using the first sensor in order and the second double-side read mode of reading both sides (first and second sides) of an original in one transport using the CIS 50 of the second sensor placed on the opposed side to the first sensor with the transport passage between. Either of the modes can be selected automatically or based on user's specification, etc., as required. Accordingly, either of the double-side read modes can be selected appropriately for use in response to the application of monochrome output or color output, importance placed on the speed (productivity) or the image quality, etc., for example.

In the description of the embodiment, read mode selection is executed by the image read control 91 of the processor 80, but can also be executed by a host system, etc., for controlling the whole of an image processing apparatus such as a digital color copier, for example.

Thus, according to the invention, to execute double-side original read, the image reader and the original feeder excellent in the ease of use can be provided.

What is claimed is:

1. An image reader comprising:
   a paper feed section for feeding an original from a bundle of originals;
   a transport passage for transporting the original fed by the paper feed section;
   a first sensor for reading an image on one side of the original from one side of the transport passage; and
   a second sensor for reading an image on the other side of the original from the opposed side to the one side of the transport passage,
   wherein the image reader has a first double-side read mode of reading the images on both sides of the original using the first sensor in order, and
   a second double-side read mode of reading the images on both sides of the original in one transport of the original to the transport passage using the first sensor and the second sensor.

2. The image reader as claimed in claim 1 wherein the first double-side read mode is a mode of reading one side of the original using the first sensor and then reversing the side of the original in the transport passage and reading the other side of the original using the first sensor.

3. The image reader as claimed in claim 1 wherein the second sensor differs from the first sensor in resolution characteristic.

4. The image reader as claimed in claim 1 wherein the first sensor is an image sensor for reading reflected light on the original through a reduction optical system, and
   wherein the second sensor is an image sensor for reading reflected light on the original from a closer position than the first sensor.

5. The image reader as claimed in claim 1 wherein the second double-side read mode is used when monochrome image data is output.

6. An image reader comprising:
   first double-side read means for reading a first side of an original using a first sensor placed on one side of a transport passage and then reading a second side of the original again using the first sensor;
   second double-side read means for reading a first side and a second side of an original using the first sensor and a second sensor placed on the other side of the transport passage; and
   selection means for selecting either of the first double-side read means and the second double-side read means to read the original.

7. The image reader as claimed in claim 6 wherein the selection means selects the first double-side read means to output color image data and selects the second double-side read means to output monochrome image data.

8. The image reader as claimed in claim 6 wherein the selection means selects the first double-side read means to place importance on high image quality and selects the second double-side read means to place importance on speeding up.

9. The image reader as claimed in claim 6 further comprising transport passage switch means for switching the original transport passage between read of the first double-side read means and read of the second double-side read means.

10. An original feeder being installed in a reader for reading an original, the original feeder comprising:
    a first double-side read transport passage for transporting an original and reading a first side of the original by the reader and then again transporting the original and reading a second side of the original by the reader;
    a read sensor being placed at a position opposed to the reader with respect to an original transport passage for reading a second side of the original at almost the same timing as reading the first side of the original by the reader; and
    a second double-side read transport passage for transporting the original using a transport passage different from the first double-side read transport passage to read the second side using the read sensor.

11. The original feeder as claimed in claim 10 wherein the first double-side read transport passage and the second double-side read transport passage share a part of the original transport passage.

12. The original feeder as claimed in claim 10 wherein the read sensor is a CIS (Contact Image Sensor) and is placed with a sensor face in a downward direction.

13. An original read method of reading both sides of an original transported by an original feeder, the original read method being capable of outputting color image data and comprising:
    determining whether or not monochrome image data is to be output;
    if it is determined that monochrome image data is to be output, reading both sides of an original using a first sensor and a second sensor placed at an opposed position to the first sensor with respect to a transport passage;
    determining whether or not color image data is to be output; and
    if it is determined that color image data is to be output, reading both sides of an original using the first sensor without using the second sensor.

14. An original read method of reading both sides of an original transported by an original feeder, the original read method comprising:
    determining whether or not high-quality image data is to be output;
    if it is determined that high-quality image data is to be output, reading a first side of an original by a first sensor and then reversing the original and reading a second side of the original by the first sensor; and
    if it is determined that high-quality image data need not be output, reading both sides of the original in one original transport using the first sensor and a second sensor placed at an opposed position to the first sensor with respect to a transport passage.

* * * * *